Nov. 16, 1937.   J. R. HOLMES   2,099,114

VEHICLE WHEEL SUSPENSION

Filed July 12, 1934

INVENTOR.
John R. Holmes.
BY
Harness, Lind, Peter & Harris
ATTORNEYS.

Patented Nov. 16, 1937

2,099,114

UNITED STATES PATENT OFFICE 2,099,114

VEHICLE WHEEL SUSPENSION

John R. Holmes, Highland Park, Mich., assignor to Chrysler Corporation, Detroit, Mich., a corporation of Delaware Application July 12, 1934, Serial No. 734,720

9 Claims. (Cl. 280—124)

This invention relates to wheel suspensions for vehicles and refers more particularly to so-called independent wheel suspensions for motor vehicles.

In suspensions of the type mentioned above, it is important to provide a predetermined desired wheel alignment, and in connection with the steering wheels it is particularly desirable to maintain accuracy in the mounting of such wheels to provide the desired degree of camber and caster. Failure to maintain the aforesaid characteristics may, and often does, result in excessive tire wear, difficult steering, shimmy or tramp of the steering wheels, and other undesirable effects.

In actual production, difficulty has been experienced in maintaining the aforesaid characteristics in keeping with practical limitations of cost, workmanship, manufacturing tolerances, and the like.

It is an object of my invention to overcome the aforesaid undesirable effects and difficulties.

A further object of my invention resides in the provision of an improved wheel suspension particularly adapted for manufacture at relatively low cost.

A still further object of my invention resides in the provision of an improved wheel suspension capable of manufacture in keeping with ordinary practical limitations of manufacturing tolerances.

A further object of my invention is to provide simple means for adjusting a vehicle steering wheel for caster or camber or both without requiring disassembly of the suspension, and to provide a common connector means embodying a plurality of adjustments for different wheel alignment characteristics.

In carrying out the objects of my invention, I preferably provide suitable means in the wheel suspension mechanism for conveniently and accurately compensating for any inaccuracies introduced in the manufacture and assembly of the parts thereof. Thus, by reason of my novel compensating means, any inaccuracies in wheel alignment, caster or camber may be readily corrected.

Further objects and advantages of my invention will be apparent from the following detailed description of my invention, reference being had to the accompanying drawing in which I have shown one form which my invention may assume by way of example and illustration.

In the drawing in which like reference characters represent corresponding parts throughout the several views, Fig. 1 is a front elevational view of the forward vehicle steering wheels showing my improved suspension mechanism therefor;

Figure 1:
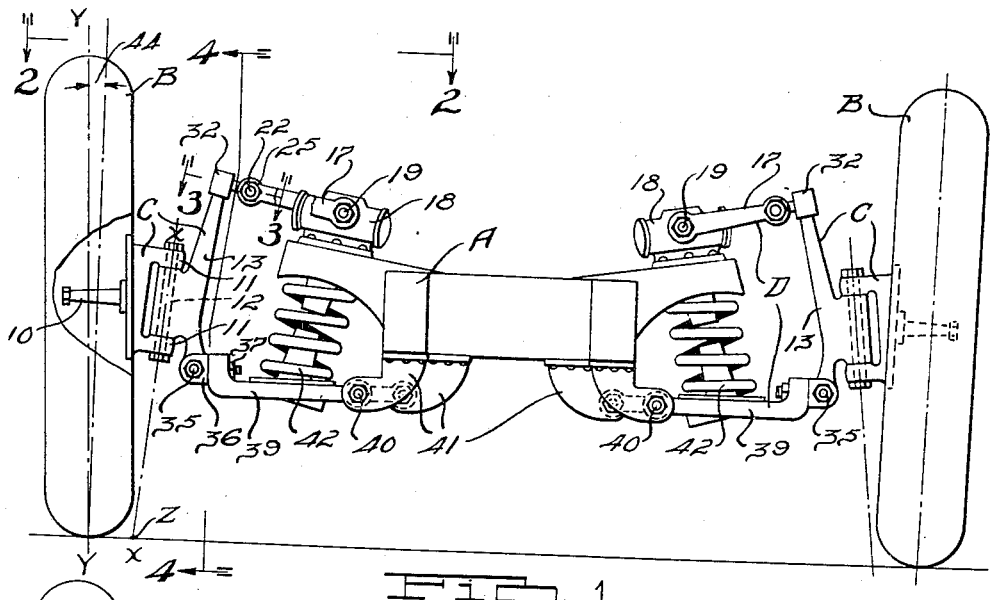

In the drawing reference character A represents the frame or load carrying structure of the motor vehicle, the body, engine, and driving parts of the motor vehicle being omitted for clarity in my disclosure since such parts are well known in the art and may be of any desired form and arrangement.

I have illustrated my invention in connection with the forward steering ground wheels B of the motor vehicle, each wheel being journaled on a spindle 10 of the wheel supporting means C. This wheel supporting means of each of the wheels B is also preferably formed with bearings 11 for receiving a king pin 12 providing swiveling of the steering wheel about the axis X—X of the king pin or steering knuckle pivot.

As the parts associated with each of the wheels B are similar, the description, for the most part, will be limited to one of the wheels and parts associated therewith.

The wheels B in their normal positions illustrated in Fig. 1 are preferably cambered so that the plane Y—Y of each wheel extends upwardly and outwardly at an inclination to the vertical. The desirability of camber for steering wheels is generally accepted and understood and when the axis X—X lies along the intersection of plane Y—Y with the ground, then the traction resistance of the wheels has no effective lever arm. It is generally desirable to arrange the king pin so that its axis X—X intersects the ground a small distance inside the plane Y—Y, as represented by the point Z in Fig. 1 in order to provide a lever arm tending to restore the wheel to its straight-ahead position.

In order to support the frame structure A by the wheels B and to provide substantially independent suspension or springing movement of each of the wheels B relative to the other, I have provided the connecting means D intermediate the frame and wheel supporting means C. This connecting means includes an arm or steering knuckle bracket 13 associated with each of the wheels B, each arm being adapted to support or carry a king-pin 12 by reason of the bearing portion thereof which lies between the aforesaid spaced bearings 11.

Arm 13 extends generally vertically in the sense that the ends thereof are positioned in spaced relation, the connecting means D, in the illustrated embodiment of my invention being arranged in a substantially trapezoidal shape. Thus, during a displacement of the wheel, the track between wheels B remains practically unchanged when either wheel strikes a depression or encounters a bump in the roadway. The linkage or connecting means D, while of the general parallelogram type, is preferably arranged in the form of a rectangle and more particularly in the form of a trapezoid defined by various supports for the linkage parts.

Extending generally laterally or transversely of the vehicle are the upper and lower linkages or connectors 14 and 15 respectively, these connectors being of the so-called wishbone type or generally V-shaped. Where the aforesaid trapezoidal arrangement of linkage is desired, connector 15 is somewhat longer than connector 14 as illustrated, this arrangement deviating somewhat from a true parallelogram but providing substantially vertically guided movement of the point of wheel tread contact with the ground, on displacement of the wheel. Connector 14 has its arms 16 and 17 thereof diverging toward frame A for pivotal connection therewith. With this in view, the frame structure A may rigidly support a shock absorber 18 of any suitable type having an oscillating actuating shaft or pivot pin 19 to which the inner ends of arms 16 and 17 are connected. Thus, the shaft 19 forms the pivotal support for the arms of connector 14 and, if desired, such shaft may be supported directly by the frame structure. The shock absorber, in effect, constitutes a frame bracket for the pivot pin 19.

The outer ends of arms 16 and 17 have aligned smooth cylindrical bores or openings 20 for slidably receiving the oppositely extending threaded shanks 21 and 22 of the connector or bracket 23. Outer nuts 24 and 25 are threaded on the shanks and cooperate with inner nuts 26 and 27 for adjustably locking the connector bracket 23 with arms 16 and 17.

The connector bracket 23 has a central smooth cylindrical bore or opening 28 at right angles to openings 20, the opening 28 slidably receiving the inner threaded end 29 of the adjustable connector member 30, the outer end thereof being suitably connected to the upper end of arm 13 as by the ball 31 and socket 32. Outer and inner nuts 33 and 34 respectively are threaded on the end 29 of connector member 30 and adjustably hold the connector relatively to the connector bracket 23.

The lower end of arm 13 pivots on a pin 35 carried by a bracket 36 secured to the lower connector 15 by the bolt and nut assembly 37, the inwardly diverging arms 38 and 39 of the lower connector 15 being pivotally supported on pins 40 carried by brackets 41 rigidly mounted on frame A.

The vehicle frame structure A and the load carried thereby is yieldingly supported by the wheel supporting means C and connecting means D by reason of suitable springs illustrated at 42 intermediate the frame structure and lower connectors 15. If desired, other forms of connectors and springing means may be provided and it is not my intention to limit my invention in its broader aspects to the particular form and arrangement of such parts shown in my drawing for purposes of illustration.

From the foregoing reference to the desirable characteristics of wheel geometry it follows that, prior to the teachings of my invention, it would be necessary to maintain at undesirably high cost an unusually high degree of machining tolerance and skill in assembly and general workmanship, if these desirable characteristics are to be obtained with the desired degree of precision in the production of motor vehicles. These objectionable factors are most pronounced in the so-called independently sprung wheels to which class my invention particularly relates. My invention will compensate for inaccuracies in the various parts of the linkage forming a wheel suspension mechanism.

In overcoming the aforesaid difficulties and expense, I have provided means for adjusting the normal position of any ground wheel whereby to conveniently and accurately compensate for errors introduced during the manufacture and assembly processes, as well as during the life of a motor vehicle from a service adjustment standpoint. My adjusting means is furthermore operable after assembly of the wheel suspension and without requiring disassembly of the parts, jacking the car up, or other operations beyond the manipulation of the adjusting means.

Figure 2:
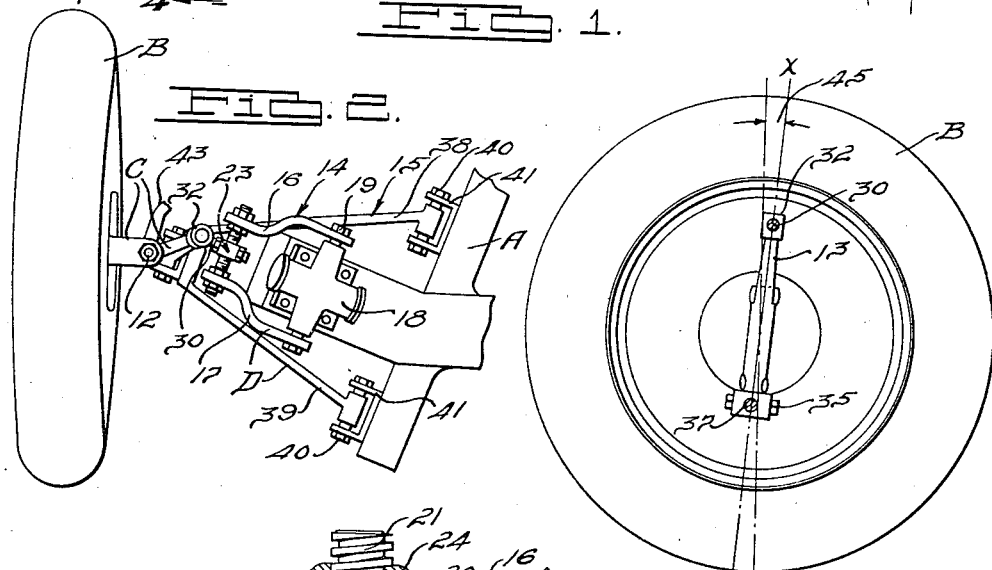
Fig. 2 is a top plan view of my wheel suspension, the view being taken as indicated by the line 2—2 of Fig. 1.

In operation of the vehicle suspension and adjusting means it will be apparent that either of the steering wheels B is bodily displaceable independently of the other wheel, the arm 13 being displaced upwardly and downwardly with the wheel and being guided in the aforesaid substantially parallelogram movement by the link pivot pins 19, 35 and 40 and also by the ball 31. Each steering wheel is adapted for steering rotation about its king-pin 12 in the well-known manner, a portion of one of the steering arms 43 being shown in Fig. 2.

Figure 4:
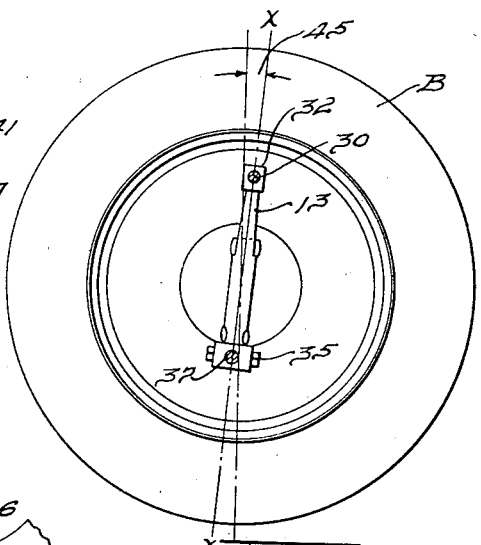
Fig. 4 is a sectional elevational view of my adjusting means taken through the line 4—4 of Fig. 1.

In Fig. 1 the camber angle of a typical steering wheel B is designated at 44 and in Fig. 4 the caster angle is designated at 45. Assuming that it is desired to increase the camber angle of a wheel and referring particularly to Fig. 3, the inner nut 34 is first backed away from the connector bracket 23 and then the adjusting nut 33 is turned. Rotation of the nut 33 will cause the connector member 30 to move axially outwardly for one direction of rotation of nut 33, the upper end of the arm 13 swinging outwardly about the lower pivot pin 35 to increase the camber angle 44. The weight of the vehicle will maintain the nut 33 against the connector bracket 23 during this adjustment and when the proper camber angle has been determined the lock nut 34 is then brought against the connector bracket 23 and the connector member 30 will then be securely locked with respect to the connector bracket 23. During the rotative adjustment of the nut 33 it may be found necessary in some instances to hold the connector member 30 against rotation by holding a wrench to the square section 30$^a$ of the connector member 30 so that it will feed axially or, if desired, after backing the lock nut 34 away from the connector bracket 23 the connector member 30 may be moved axially outwardly to the desired position followed by rotation of the adjusting nut 33 into engagement with the connector bracket 23 as will be readily apparent from the drawing.

When it is desired to reduce the camber angle 44 it is only necessary to reverse the direction of adjustment of the connector member 30 so as to swing the upper end of the arm 13 inwardly instead of outwardly. During such adjustment the nut 33 is first backed away from the connector bracket 23 and the connector member 30 is then moved inwardly of the connector member, the nuts 33 and 34 being then tightened against the connector bracket 23 to lock the parts in the desired adjusted position.

Figure 3:
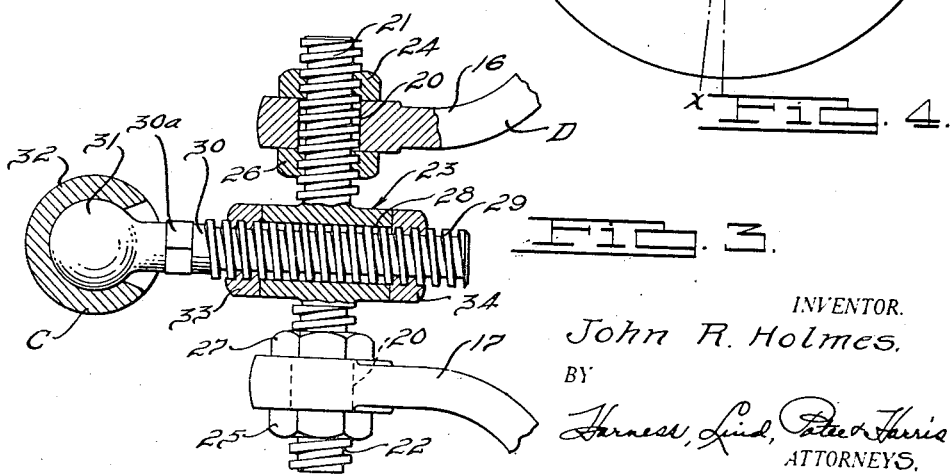
Fig. 3 is a detail sectional view of the upper connector illustrating my adjusting means, the section being taken along the line 3—3 of Fig. 1.

When it is desired to adjust the caster angle 45 of one of the wheels B, such adjustment may be readily obtained by effecting a shifting movement of the connector bracket 23 forwardly or rearwardly between the outer ends of the upper wishbone arms 16 and 17. Assuming, for example, that it is desired to decrease the caster angle 45 by swinging the arm 13 forwardly at its upper end about the lower pivot pin 37, such adjustment is obtained by backing off the nuts 25 and 26 and then rotating either of the nuts 24 or 27 sufficiently to thread the connector bracket 23 forwardly after which all of the nuts are tightened against their associated link arms as shown in Fig. 3 and the connector bracket 23 is thereby rigidly secured between the ends of the arms 16 and 17. It will also be apparent that the connector bracket 23 may be readily adjusted rearwardly to increase the caster angle 45 by reversing the direction of adjustment of the connector bracket and it will furthermore be apparent that the adjustment of the caster angle may be made independently of the camber angle setting and vice versa. It will also be apparent that the adjustment of the caster angle may be readily effected with the parts of the wheel suspension assembled by merely making an adjustment to the nuts associated with the threaded shanks 21 and 22 of the connector bracket 23.

Various modifications and changes will be apparent from the teachings of my invention and I do not limit my invention in its broader aspects to the particular combination and arrangement of parts which I have shown and described in order to illustrate the principles of my invention.

What I claim is:

1. In a suspension for a steering ground wheel of a motor vehicle having a frame structure, wheel supporting means including a substantially vertically extending arm, upper and lower linkages intermediate said frame structure and said arm, an adjustable connector between said arm and one of said linkages, said connector having a threaded stem supported by the last said linkage, and a nut threaded on said stem adapted to adjust said stem laterally of the vehicle to vary the wheel camber.

2. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and rotatable means threaded on said stem and adapted on rotation thereof to adjust said stem in its axial direction to vary the wheel camber.

3. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and a nut threaded on said stem between said knuckle bracket end and said link means and adapted on rotation thereof to adjust said stem in its axial direction to vary the wheel camber.

4. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, rotatable means threaded on said stem and adapted on rotation thereof to adjust said stem in its axial direction to vary the wheel camber, and locking means for said stem and link means.

5. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, a nut threaded on said stem between said knuckle bracket end and said link means and adapted on rotation thereof to adjust said stem in its axial direction to vary the wheel camber, and a second nut threaded on said stem for locking said stem to said link means.

6. In a suspension for a cambered ground wheel of a motor vehicle having a frame structure, wheel supporting means including a knuckle bracket, link means intermediate said frame structure and one end of said knuckle bracket for guiding displacement of said wheel, a connector member between said knuckle bracket end and said link means, said connector member having a stem, and rotatable means threaded on said stem and adapted on rotation thereof to adjust said stem in its axial direction to vary the wheel camber, the wheel suspension being so arranged that the stem is normally urged toward said link means.

7. In a suspension for a ground wheel of a motor vehicle having a frame structure, wheel supporting means including a knuckle bracket, link arms swingingly supported at their inner ends to said frame structure, said link arms having aligned openings at their outer ends, a connector bracket having journal members rotatably mounted in said openings, means for securing said connector bracket in said openings, and means adjustably connecting said connector bracket to said knuckle bracket for lateral displacement of said knuckle bracket relative to said journal members.

8. In a suspension for a steering ground wheel of a motor vehicle having a frame structure, wheel supporting means including a substantially vertically extending arm, upper and lower linkages intermediate said frame structure and said arm, adjustable connecting means including a manually adjustable operating element between said arm and one of said linkages, and means responsive to manual adjustment of said operating element for displacing said arm laterally of the vehicle to vary the wheel camber.

9. In a suspension for a steering ground wheel of a motor vehicle having a frame structure, wheel supporting means including a substantially vertically extending arm, upper and lower linkages intermediate said frame structure and said arm, adjustable connecting means intermediate one end of said arm and one of said linkages, said connecting means including a manually rotatable adjusting element, and means responsive to manual rotation of said adjusting element for displacing said arm end laterally of the vehicle to vary the wheel camber.

JOHN R. HOLMES.